United States Patent
Maeda

(10) Patent No.: US 6,379,083 B1
(45) Date of Patent: Apr. 30, 2002

(54) METHOD FOR THE REMEDIATION OF SOIL CONTAMINATED WITH ORGANIC HALIDE COMPOUNDS

(75) Inventor: Terunobu Maeda, Tokyo (JP)

(73) Assignee: Hazama Corporation, Tokyo (JP)

( * ) Notice: Subject to any disclaimer, the term of this patent is extended or adjusted under 35 U.S.C. 154(b) by 0 days.

(21) Appl. No.: 09/508,436
(22) PCT Filed: Jul. 9, 1999
(86) PCT No.: PCT/JP99/03739
 § 371 Date: Mar. 10, 2000
 § 102(e) Date: Mar. 10, 2000
(87) PCT Pub. No.: WO00/02676
 PCT Pub. Date: Jan. 20, 2000

(30) Foreign Application Priority Data

Jul. 10, 1998 (JP) .......................................... 10-196116

(51) Int. Cl.⁷ .............................. B09C 1/04; E02D 3/10
(52) U.S. Cl. ........................... 405/128.45; 405/128.25; 405/128.2; 405/128.5; 405/128.75; 588/209
(58) Field of Search ................................. 210/747, 170; 405/128.15, 128.25, 128.3, 128.5, 128.45, 129.57, 129.75, 129.7, 129.65, 52; 423/87; 166/400, 402, 405, 245; 588/209, 220, 221, 228, 249

(56) References Cited

U.S. PATENT DOCUMENTS

| | | | |
|---|---|---|---|
| 5,009,266 A | * 4/1991 | Dieter | 166/245 |
| 5,054,961 A | * 10/1991 | Sherman | 405/128 |
| 5,275,739 A | * 1/1994 | Grant et al. | 210/682 |
| 5,290,528 A | * 3/1994 | O'Connor et al. | 423/87 |
| 5,324,433 A | * 6/1994 | Grant et al. | 210/634 |
| 5,389,267 A | * 2/1995 | Gorelick et al. | 210/758 |
| 5,445,474 A | * 8/1995 | Lundegard et al. | 405/128 |
| 5,584,605 A | 12/1996 | Beard et al. | |
| 5,628,364 A | * 5/1997 | Trenz | 166/53 |
| 5,676,207 A | * 10/1997 | Simon et al. | 166/268 |
| 5,769,961 A | * 6/1998 | Peters et al. | 134/24.1 |
| 5,893,680 A | * 4/1999 | Lowry et al. | 405/128 |

FOREIGN PATENT DOCUMENTS

JP        7136631    * 5/1995    ............. B09C/1/04

OTHER PUBLICATIONS

Y. Kitano, Kyodai Bosai–Ken Nenkan (Prevention of disasters yearbook of Kyoto University), vol. 10A, 557–587 (1967), and its excerpt English Translation.

* cited by examiner

Primary Examiner—David Bagnell
Assistant Examiner—Katherine Mitchell
(74) Attorney, Agent, or Firm—Birch, Stewart, Kolasch & Birch, LLP

(57) ABSTRACT

A method for the remediation of contaminated soil comprising causing a carbonic acid aqueous solution to penetrate into the soil to liberate and remove contaminants contained in the soil.

11 Claims, 4 Drawing Sheets

METHOD FOR THE REMEDIATION OF SOIL CONTAMINATED WITH ORGANIC HALIDE COMPOUNDS This application is the national phase under 35 U.S.C. § 371 of PCT International Application No. PCT/JP99/03739 which has an International filing date of Jul. 9, 1999, which designated the United States of America.

BACKGROUND OF THE INVENTION

1. Field of the Invention

The present invention relates to a method for the remediation of soil containing contaminants such as organic halide compounds, boron containing-compounds, chromium-containing compounds, arsenic-containing compounds, nitric acid, salt thereof, nitrous acid and salt thereof; and an agent for remediation employable for the method.

2. Description of the Related Art

As contaminants (contaminated substances) contained in soil or groundwater, there have been known various substances, for examples, organic halides such as organic chlorides, compounds of heavy metal such as hexavalent chromium ($Cr^{6+}$), arsenic-containing compounds, nitrogen in the form of nitric acid or nitrous acid and boron containing-compounds. Even if these contaminants are soluble in water, all of them do not flow out to reach the groundwater. They usually remain in the soil in the form of their various compounds, and slowly flow into the groundwater. Otherwise, when the contaminants adhere to the soil, most of them scarcely flow into the groundwater. Remediation of the contaminated soil and groundwater requires much more cost and time compared with those in method of preventing the contamination from its occurring. Therefore, the efficient method for remediation that enables reduction of cost and time is greatly desired.

For instance, volatile organic halides such as trichloroethylene that has been employed in a large amount for industrially washing various machines to remove stain-containing oils, have been increasingly regulated from the consideration of environment pollution. However, a large amount of organic halides already have been employed, and therefore soil and groundwater pollutions have been widely advanced. In more detail, the organic halides such as trichloroethylene are stable and scarcely decomposed by microorganisms, and hence the organic halides abandoned in the soil not only contaminate the soil per se, but also finally do the river or groundwater that is occasionally source for drinking water.

Examples of methods for remedying the soil contaminated with the volatile organic compounds such as organic halides include soil-gas sucking method, groundwater pumping-up method, and soil-digging method. The soil-gas sucking method is of coercively sucking aimed substances existed in an unsaturated zone (layer). This method comprises providing wells for suction in the soil (land formation) by boring, reducing the pressure within the wells by a suction pump, collecting the vaporized organic compounds into the wells, and leading the compound to the underground to cause them to be adsorbed by activated carbon for treatment. In the case that the contamination by the organic compounds extends to an aquifer, adopted is a method comprising providing a water pump within the suction wells and pumping up water together with soil-gas to treat them.

The groundwater pumping-up method is performed by providing pumping-up wells within the soil and pumping up contaminated groundwater to treat it. Further, the soil-digging method is done by digging the contaminated soil and subjecting the dug soil to a wind drying and heat treatment to remove and collect the organic compounds.

In the soil-gas sucking method and groundwater pumping-up method of these conventional methods, only water or air is sucked and removed, which results in formation of passages for water or air in the soil. Therefore, the methods have low efficiency of remediation and require a long term (e.g., several to ten years) for removal of contaminants. Moreover, the soil-digging method requires considerable cost when it is applied to a wide area.

When the soil or groundwater is contaminated by the organic halides, there are also in many times that they are done by various substances, e.g., boron containing-compounds, chromium-containing compounds, arsenic-containing compounds, nitric acid, salt thereof, nitrous acid and salt thereof (nitrogen derived from nitric or nitrous acid). It is desirable that the method for the remediation is further effective in the above substances other than the organic halides.

BRIEF SUMMARY OF THE INVENTION

The object of the present invention is to provide the method for the remediation of soil containing contaminants (generally water-soluble substances) such as organic halide compounds in which the contaminants can be removed in high efficiency, short period and low cost; and the agent for remediation employable for the method.

In the conventional methods for the remediation of soil contaminated with the organic halides, the organic halides which has been brought together with rain water etc. into in the groundwater is removed in the form of groundwater containing the organic halides; or the organic halides in the soil is sucked to remove. However, the contaminants adhering to the soil cannot be easily removed. Otherwise, non-volatile contaminants are not effectively removed by the suction method.

The inventors have been studied for obtaining an agent for remediation which is capable of removing efficiently contaminants adhering to soil and which does not cause secondary contamination. In the course of the study, they have noticed "Carbonated Water Corrosion Effect against Minerals", Y. Kitano, Kyodai Bosai-Ken Nenkan (Prevention of disasters yearbook of Kyoto University), Vol. 10A, 557 (1967), and further studied based on the effect. As a result, they have found that the carbonated water (carbonic acid aqueous solution) effectively liberates the contaminants in water from the soil (especially the limited concentration), to attain to the present invention.

The above-mentioned objects are attained by:

a method for the remediation of contaminated soil comprising causing a carbonic acid aqueous solution to penetrate into said soil to liberate and remove contaminants contained in the soil;

a method for the remediation of contaminated soil comprising providing wells for feeding carbonic acid and wells for pumping water with a distance between the wells in the soil by digging the soil, introducing a carbonic acid aqueous solution or carbon dioxide gas into the wells for feeding carbonic acid to liberate contaminants contained in the soil, and pumping up water from the wells for pumping water to remove the liberated contaminants; and a method for the remediation of contaminated soil comprising providing a water cutoff wall for surrounding the soil, providing wells for feeding carbonic acid and wells for pumping with a distance between the wells within the surrounded area by digging the soil, introducing carbonic acid aqueous solution or carbon dioxide gas into the wells for feeding carbonic acid to elevate a level of groundwater in the wells and to wet the soil to the surface thereof, whereby contaminants contained in the soil are liberated, and pumping up water from the wells for pumping water to remove the liberated contaminants.

In the above-mentioned methods, the contaminants contained in the soil are preferably eluted in the carbonic acid aqueous solution. The contaminants contained in the soil preferably comprise at least one selected from the group consisting of an organic halide compound, a boron containing-compound, chromium-containing compound, an arsenic-containing compound, nitric acid, nitrate, nitrous acid and nitrite. These contaminants have a common property soluble in water. In more detail, the inventors have found that the organic halides are also soluble to some extent in water. Further, it is preferred that in the case of using the carbonic acid aqueous solution, the plural solutions (i.e., dilute and concentrated solutions) are alternately introduced (e.g., poured) or caused to penetrate into the soil with different concentrations from each other, and that in the case of using the carbon oxide gas, the gas is introduced into the soil at different feeding rates alternately. The introducing or penetrating of the carbonic acid aqueous solution preferably comprises a step of penetrating or introducing the solution and a step of then passing it through the soil. It is preferred that water is poured into the soil before introduction of the carbonic acid aqueous solution into the soil. Further, it is preferred that salt (NaCl) is added before pouring of the carbonic acid aqueous solution. Water pumped up from the wells for pumping water generally contains a carbonic acid aqueous solution.

The above-mentioned objects are also attained by an agent (cleaning agent) for remedying contaminated soil to be poured into the soil, which comprises a carbonic acid aqueous solution having a carbonate ion concentration of 100 to 10,000 ppm.

The agent for remediation can contain an inorganic salt or a hydrophilic organic solvent.

The above-mentioned carbonate ion concentration means, in the invention, a value obtained by measuring according to a strontium halide/monobasic acid titration method described in JIS K 0101 25.

In the invention, the contaminants are generally water-soluble substances, and the water-soluble substances include those that are capable of dissolving in a slight amount in water, preferably those capable of dissolving in at least 0.01 g (particularly at least 0.01 g) per 1 L(litter) of water in water.

DETAILED DESCRIPTION OF THE INVENTION

Figure 1:
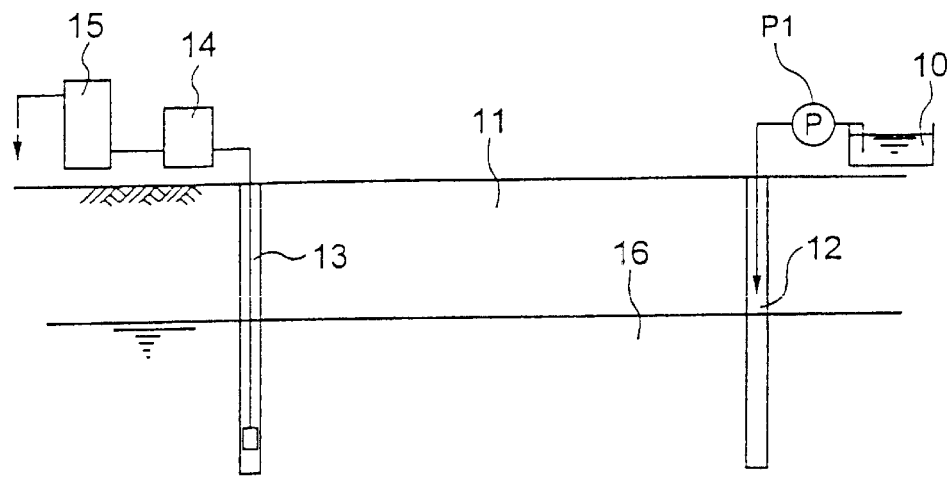
FIG. 1 is a section view showing a preferred embodiment of the method for remediation according to the invention.

The method for the remediation of contaminated soil according to the present invention comprises basically a step of causing a carbonic acid aqueous solution to penetrate into said soil to liberate and remove contaminants contained in the soil.

The contaminants that correspond to the objects to be purified in the invention are, for example, organic halide compounds, boron containing-compounds, chromium-containing compounds, arsenic-containing compounds, nitric acid, nitrates, nitrous acid and nitrites. Examples of the organic halide compounds include volatile organic halides such as vinyl chloride, 1,1-dichloroethylene, 1,2-dichloroethylene, trichloroethylene, tetrachloroethylene, dichloromethane, tetrachloromethane, 1,2-dichloroethane, 1,1,1-trichloroethane, 1,1,2-trichloroethane, 1,1,2,2-tetrachloroethane and dichlorodifluoroethane. Further, the method is also effective in organic solvents such as benzene, xylene and toluene. The boron containing-compounds are considered to usually exist in the form of oxides such as boric acids. Examples of the chromium-containing compounds include generally hexavalent chromium compounds such as $CrO_3$, $Na_2Cr_2O_7$ and $K_2Cr_2O_7$. The nitric acid, nitrates, nitrous acid and nitrites are generally originated from nitrogenous fertilizer, and are present in the form of the ammonium salt, potassium salt or sodium salt.

In the invention, a carbonic acid aqueous solution is employed as an agent for remediation to wash and liberate contaminants contained in soil from the soil. In the case that carbon dioxide is used instead for the carbonic acid aqueous solution, the carbon dioxide is introduced into water of the wells to be dissolved in water, whereby carbonic acid aqueous solution is formed. It is impossible to coercively liberate the contaminants adhering to the soil by depending upon action of natural rain or applied water. However, it is inadequate to employ such substances that bring about environmental pollution to liberate the above contaminants. According to the wide study of the present inventors, they have found the followings: the carbonic acid aqueous solution shows action (i.e., rinse effect) that slightly erodes the surfaces of the soil (e.g., sand or clay) generally consisting of mineral, whereby the isolation of volatile organic halides adhering to the soil can be promoted. Use of the carbonic acid aqueous solution enables effective isolation and removal of the water-soluble contaminants (e.g., organic halides) without contamination of environment.

The carbonic acid aqueous solution generally has a carbonate ion concentration of 100 to 10,000 ppm, preferably 500 to 5,000 ppm. The agent (washing agent) for remediation comprising the carbonic acid aqueous solution can further contain an inorganic salt, a hydrophilic solvent or a hydrophilic binder.

Examples of the inorganic salt include NaCl, KCl, $MgCl_2$ and $CaCO_3$. Preferred is NaCl. The salt is usually employed in 0.01 to 5 mass % based on the total of the agent. Example of the hydrophilic solvent includes ethanol, and the solvent is generally used in 0.01 to 5 mass % based on the total of the agent. Examples of the hydrophilic binder include disaccharides such as sucrose, sucrose derivatives such as sucrose higher fatty acid ester, monosaccharides such as glucose, alginic acid, pullulan, polyvinyl alcohol (PVA), carboxymethylcellulose (CMC), polyacrylamide, cyamoposis gum, methylcellulose and hydroxyethylcellulose. Preferred are pullulan (especially because of low viscosity of its aqueous solution), hydroxyethylcellulose, sucrose, glucose and PVA. Use of biodegradable polymer as the hydrophilic binder is effective in the prevention of secondary environmental pollution. The binder is generally employed in the amount of 0.01 to 5 mass % based on the total of the agent.

The above-mentioned additive materials can be appropriately selected and employed depending upon the kinds of the contaminants.

Subsequently, the method for the remediation of soil containing contaminants according to the invention is explained in detail. The method of the invention liberates contaminants from the soil containing the substances using a carbonic acid aqueous solution, and therefore the liberated substances is required to be removed. The removal is generally performed by providing wells in the following manner. Since any methods can be utilized so long as the contaminants is removed, for example, it is possible to pour the a carbonic acid aqueous solution into contaminated soil and then suck the soil.

FIG. 1 shows preferred embodiment of the method for the remediation according to the invention. Wells for feeding carbonic acid 12 and wells for pumping water 13 are provided with a distance between the wells on contaminated soil (or ground) 11 such that these wells reach groundwater 16. The provision is, for instance, conducted by means of boring. Water containing contaminants is pumped up by wells for pumping water 13, and the water is passed through air-seasoning (aeration) apparatus 14 and activated-carbon adsorption tower 15 to remove the contaminants. In this system, a carbonic acid aqueous solution 10 is poured into the wells for feeding carbonic acid 12 using a pump P1, and then water is pumped up from the wells for pumping water 13. In the procedures, the contaminants in the soil are dissolved in a carbonic acid solution, and the carbonic acid solution containing contaminants is pumped up together with groundwater to remove. When the carbonic acid aqueous solution 10 is poured into the wells for feeding carbonic acid 12, the solution penetrates the side walls of the wells as well as the bottom.

In the case that the contaminated soil contain water in a high water content and the wells for feeding carbonic acid 12 has groundwater in high level, it is preferred to pour a carbonic acid aqueous solution of high concentration or carbon dioxide into the groundwater. On the other hand, when the wells for feeding carbonic acid 12 has groundwater in low level or no groundwater, it is preferred to pour a carbonic acid aqueous solution of appropriate concentration into the groundwater or the wells. Otherwise, the procedures in which water is first poured and then carbon dioxide is inserted, are mostly preferred. Further, the procedures in which water is first poured, subsequently additives such as NaCl are introduced, and then carbon dioxide is inserted, are also preferred because other components soluble in water are beforehand removed.

The carbonic acid aqueous solution used in the above methods has generally a carbonate ion concentration of 100 to 10,000 ppm, preferably 500 to 5,000 ppm. If the ion concentration is over the range, the solution generates bubbles in the contaminated soil to lower effect of removing contaminant. Since it is preferred to make the concentration lower in view of environmental pollution, the maximum value of the ion concentration is determined in view of these points.

For example, the amount or concentration of the carbonic acid aqueous solution or the amount of carbon dioxide that is fed from the wells for feeding carbonic acid is changed day by day, whereby the concentration of the carbonic acid aqueous solution passed through soil varies to generate osmotic pressure, which enables unmoved water remained in voids of soil to move. Hence, this method is capable of remedying the whole of the contaminated soil in fair uniform and high efficiently.

The pumped water, which contains the contaminants, is passed through an air-seasoning (aeration) apparatus 14 and activated-carbon adsorption tower 15, whereby the contaminants are removed. Thus, the purified water can be discharged. The removal of the contaminants of the contaminated water can be performed by passing the water through a layer of iron powders, or by subjecting to the activated carbon-treatment after decomposition of the contaminants such as organic halides.

Figure 2:
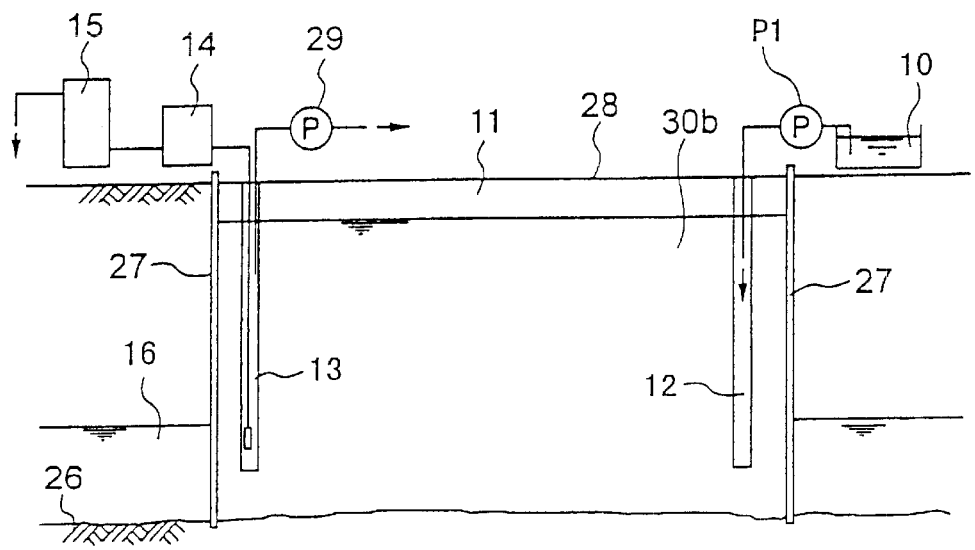
FIG. 2 is a section view showing another preferred embodiment of the method for remediation according to the invention.

Otherwise, the method for the remediation of the invention can also be performed according to a process shown in FIG. 2. A water cutoff wall 27 is provided in soil to surround the contaminated soil 11, the wall reaching impermeable ground 26 under the groundwater 16, wells for feeding carbonic acid 12 and wells for pumping water 13 are disposed at intervals by digging the surrounded soil 11, and carbonic acid aqueous solution 10 is poured (or carbon dioxide gas is injected) into the wells for feeding carbonic acid by means of a pump P1, whereas water is pumped up from the wells for pumping water 13, as illustrated in FIG. 1.

In this method, the level of the groundwater is elevated by controlling the operation of pumping water up from the wells for pumping water 13, and if desired, the level is elevated so as to wet not only the soil but also their surface. Subsequently, with keeping the elevated level 30$b$ of the groundwater, water is pumped up from the wells for pumping water 13. Accordingly, this method enables pumping-up of water on the condition that the carbonic acid aqueous solution penetrates and passes through the contaminated soil. The pumped-up water containing contaminants can be treated in the same manner as the procedures indicated in FIG. 1. Further, the concentration of carbonic acid aqueous solution (agent for remediation) and carbon dioxide can use the conditions described in the explanation of FIG. 1.

Further, it is possible that the surface of the soil is covered with impermeable sheet 28 and that air in the soil is intermittently sucked by using a pump 29 for reducing pressure at the upper side of the wells for pumping water 23 to cause the carbonic acid to bubble. During this procedure, bubbles are generated in the voids of the soil, whereby the isolation of the contaminants and the dissolution of the substances into the carbonic acid aqueous solution can be promoted.

The above explanation as to the method for the remediation of the invention, corresponds to the case of providing both of wells for feeding carbonic acid and wells for pumping water. However, the invention can adopt the following methods: a method comprising providing only wells for pumping water and sprinkling or injecting carbonic acid aqueous solution directly on the surface of soil and then sucking; and a method comprising only wells for feeding and conducting only at the wells for feeding both of feeding of carbonic acid aqueous solution and sucking of water.

In the method for the remediation of contaminated soil according to the invention, as described above, a carbonic acid is caused to penetrate into the contaminated soil to liberate (generally, to liberate and dissolve) the contaminants attached to the soil in water or carbonated water. Such a method enables the remediation treatment in a much shorter term than the conventional methods such as pumping of water in voids of soil and sucking of gas in soil.

Further, in the invention, it is possible that the carbonic acid aqueous solution is caused to penetrate into the soil with varying concentration of the carbonate ion (preferably alternately varying the concentration (i.e., dilute and concentrated solutions)), which results in occurrence of osmotic pressure to enables easily unmoved water remained in fine voids of soil to move. For the reason, even if a procedure of pouring or injecting water forms water path, the method of the invention enables exchange of water in fine voids for that in other places and hence is capable of efficiently removing the contaminants.

The invention is illustrated in detail using the following Examples.

EXAMPLE 1

Remediation action by carbonic acid aqueous solution on soil contaminated with volatile organic halide 1) Experimental procedure In two columns, 100 ml of silt collected in Narita sands was charged, and saturated with water. Thereafter, the columns were substituted with trichloroethylene-saturated aqueous solution (1361.14 ppm), and carbonic acid aqueous solution was passed through the columns at a rate of 100 ml/h after standing for 12 hours. Flowing water liquid from the column was collected in 100 ml per one time and analyzed.

The concentration of carbonated ion of the above carbonic acid aqueous solution was 2,000 ppm at the beginning of the experiment (i.e., experiment of passing through carbonic acid aqueous solution), and turned to 500 ppm after 10 hours.

For comparison, the experiment was conducted using city water instead of the carbonic acid aqueous solution, and flowing water liquid from the column was collected in 100 ml per one time and analyzed.

2) Experimental Result

Figure 3:
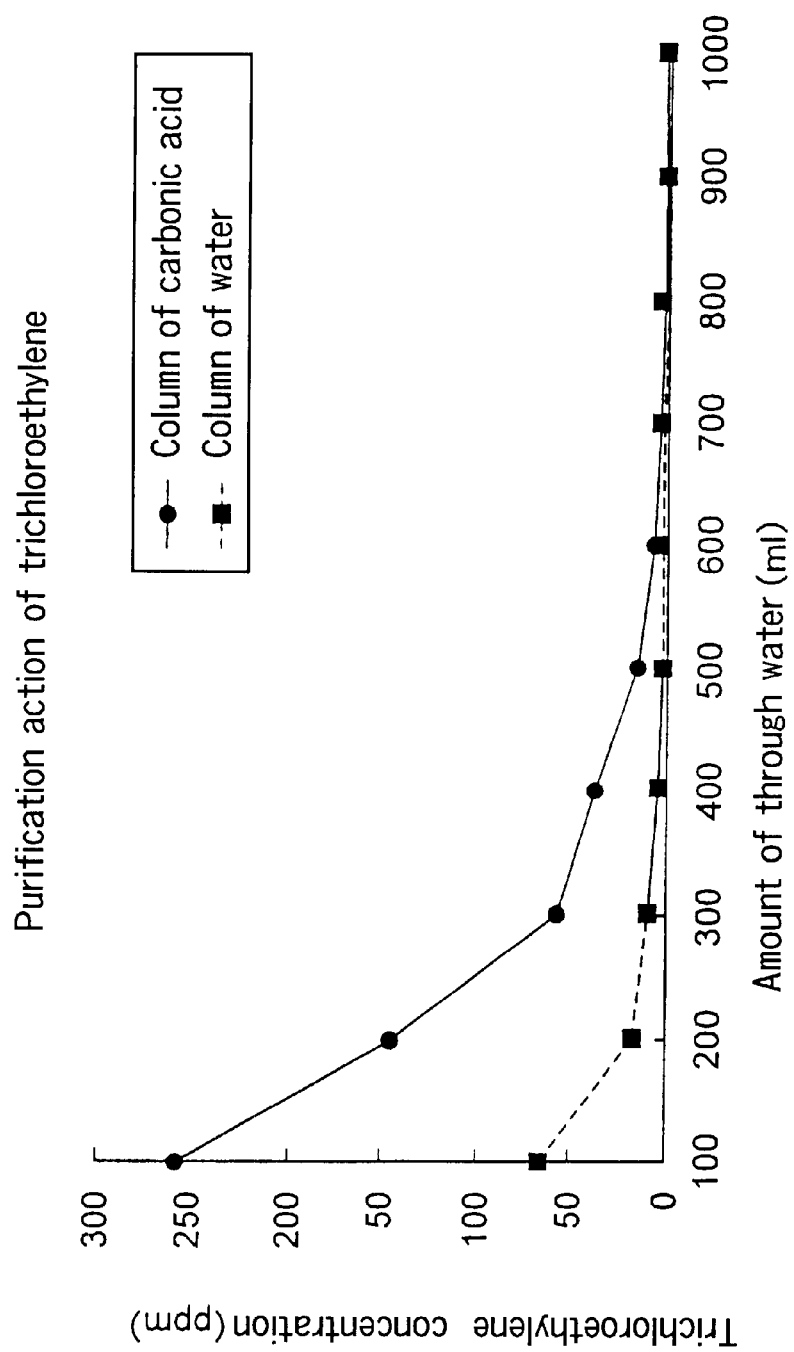
FIG. 3 is a graph showing the results of Example 1.

The above experimental result is shown in FIG. 3. The method of the invention in which the carbonic acid aqueous solution was passed through the column gave, as eluted amount, about five times amount of trichloroethylene as much as the comparison experiment using city water.

EXAMPLE 2

Measurement of retention time of volatile organic halide in soil for the purpose of estimation of remediation effect by carbonic acid aqueous solution 1) Experimental procedure In two columns for chromatography, 25 g of silt collected in Narita sands was charged, and saturated with water. Thereafter, 0.15 g of trichloroethylene was dropwise added onto the column for chromatography, and then a carbonic acid aqueous solution was passed through the columns at a rate of 1.0 ml/min. Flowing water liquid from the column was collected every 30 minutes and the amount of trichloroethylene contained in the liquid was measured.

The concentration of carbonated ion of the above carbonic acid aqueous solution was 2,000 ppm at the beginning of the experiment, and turned to 900 ppm after 240 minutes.

For comparison, the experiment was conducted using natural water instead of the carbonic acid aqueous solution, and the concentration of carbonated ion was measured in the same manner as above.

2) Experimental Result

Figure 4:
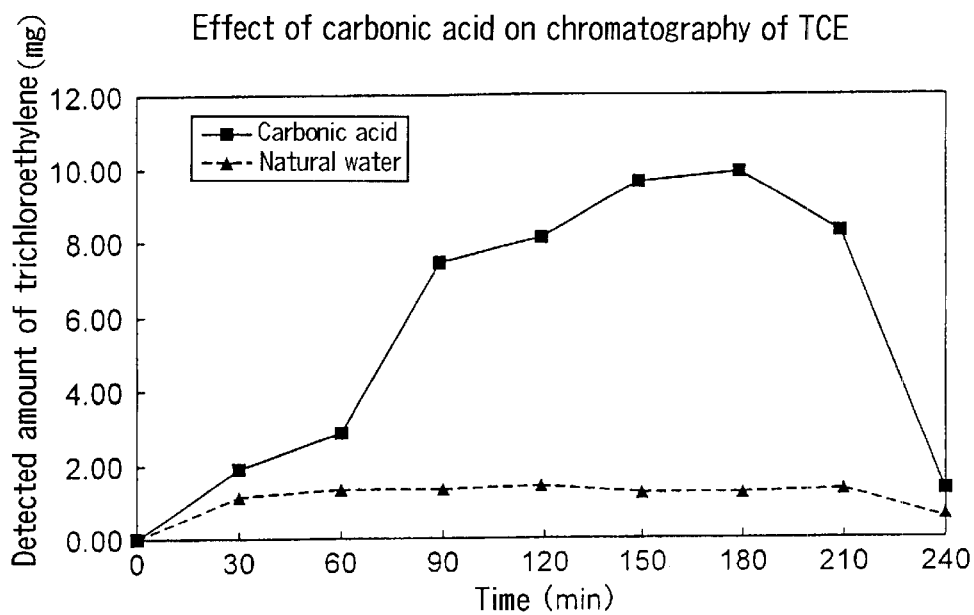
FIG. 4 is a graph showing the results of Example 2.

The above experimental result is shown in FIG. 4. The method of the invention in which the carbonic acid aqueous solution was passed through the column gave far much eluted amount of trichloroethylene in the period of about 1 hour to 3 hours as much as the comparison experiment using natural water. Hence, the result reveals that to pass the carbonic acid aqueous solution thorough the column enables trichloroethylene not to remain in soil.

EXAMPLE 3

Solubility of volatile organic halide in carbonic acid aqueous solution.

The method of the invention is considered to have an action that carbonic acid aqueous solution dissolves trichloroethylene adhering to soil. In order to prove the existence of the action, the solubility was measured.

1) Experimental procedure

Using a carbonic acid aqueous solution having carbonated ion-concentration of 7,700 mg/L (i.e., 7,700 ppm) and natural water (trade name: Eapin; carbonated ion-concentration of 0 mg/L), four kinds of carbonic acid aqueous solutions (i.e., carbonated ion-concentration: 340 mg/L, 920 mg/L, 1700 mg/L and 7,700 mg/L) were prepared.

40 ml of each of the above natural water and carbonic acid aqueous solutions was injected in a Glass-Vials provided with septum such that bubbles did not remain in the Glass-Vials. Using a syringe, 0.14 g of excess trichloroethylene was added to the water or solution, and each linked part in the Glass-Vials was sealed by the use of Teflon tape. The mixture was stirred for 30 minutes using a magnetic stirrer, and allowed to stand for 24 hours. Thereafter, a supernatant fraction was quickly collected and extracted to give trichloroethylene. These procedures were performed at temperature of 20.7° C.

1-1) Measurement of carbonated ion-concentration

As for the above natural water and carbonic acid aqueous solutions before the injection into the glass-bialbin, their carbonated ion-concentrations were measured by means of neutralization titration. The titration was conducted according to strontium chloride/monobasic acid-base titration described in JIS K 0101 25.

1-2) Measurement of trichloroethylene-concentration

Figure 5:
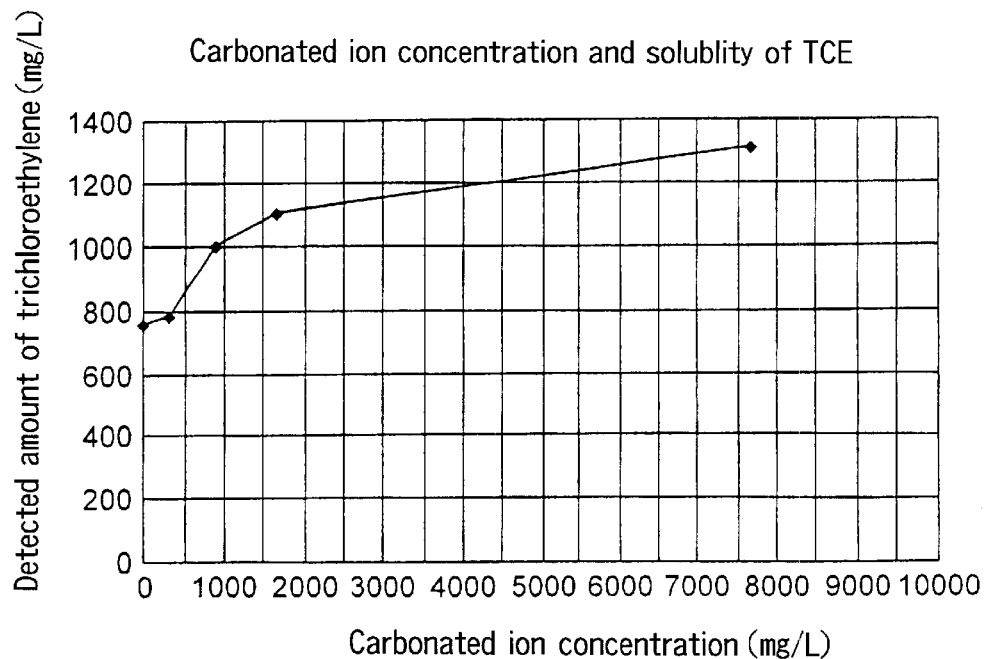
FIG. 5 is a graph showing the results of Example 3.

To the supernatant fraction obtained above, n-hexane for test of remaining agriculture chemical was added in the same amount as the fraction, and vigorously stirred to give an n-hexane layer. The layer was analyzed by a gas chromatography in the following conditions:

GC analysis conditions:
    Analyzer: GC-17A type available from Shimadzu Corp.
    Column: AQUATAC 75 m×0.53 mmφ
    Column Temperature: 210° C.
    Carrier Gas: Nitrogen
    Detector: ECD Saturated solubilitys of carbonic acid aqueous solutions in trichloroethylene that were obtained in the above Experimental procedures and measurements, are shown in the following Table and a graph of FIG. 5.

| Carbonated ion concentration (mg/L) | Detected amount of trichloroethylene (mg/L) |
|---|---|
| 0 | 750 |
| 340 | 780 |
| 920 | 1000 |
| 1700 | 1100 |
| 7700 | 1300 |

The results indicate that trichloroethylene is dissolved well in the carbonic acid aqueous solution as compared with in water. Thus, this property of the carbonic acid solution is considered to be a help to removal of contaminants.

EXAMPLE 4

Remediation action of carbonic acid aqueous solution on practical contaminated soil.

Trichloroethylent-contaminated region (soil) of which area is estimated to be 40 m square was subjected to remediation treatment. Nearly at a center of the contaminated region, a well for feeding water or carbon dioxide (depth: 5.5 m; diameter: 35 cm) was constructed by digging. A well for observation (depth: 12 m; diameter: 35 cm) was constructed by digging at distance of 8 m from the well for feeding. The depth of the well for observation corresponds to the distance from the surface to the groundwater.

(I) The remediation treatment were performed as follows:

November $1^{st}$: Into the well for feeding carbon dioxide, 3 kg of salt (NaCl) was introduced. Subsequently, pouring of water was started in a pouring rate of 5 L/min.

November $2^{nd}$ to $12^{th}$: Pouring of water was conducted in the same manner as above.

November $13^{th}$ to January $10^{th}$: Pouring of water was conducted in the same manner as above with carbon dioxide being poured in a pouring rate of 2.5 L/min (corresponding to carbonic acid aqueous solution of 1,000 ppm). In the course of the above procedure, no carbon dioxide was poured in a period of November 24th to 27th.

January $11^{th}$ to $22^{nd}$: Pouring of water was only conducted in the same manner as above.

January $23^{rd}$ to $27^{th}$: Pouring of water was further stopped.

January $28^{th}$ to February $12^{th}$: Pouring of water was conducted in the same manner as above with carbon dioxide being poured in a pouring rate of 2.5 L/min (corresponding carbonic acid aqueous solution of 1,000 ppm) again.

In the above period and thereafter, samples were collected at the well for observation (sampling), and the concentrations of trichloroethylene (TCE) were measured. The results are shown in the following Table and a graph of FIG. 6.

| Date of sampling | Treatment condition | татее TCE concentration (mg/L) |
|---|---|---|
| November $2^{nd}$ | Pouring of water | 0.037 |
| November $5^{th}$ | Pouring of water | 0.043 |
| November $7^{th}$ | Pouring of water | 0.054 |
| November $13^{th}$ | Pouring of water and $CO_2$ | 0.12 |
| November $20^{th}$ | Pouring of water and $CO_2$ | 0.36 |
| November $26^{th}$ | Pouring of water | 0.39 |
| December $2^{nd}$ | Pouring of water and $CO_2$ | 0.53 |
| December $11^{th}$ | Pouring of water and $CO_2$ | 0.30 |
| December $19^{th}$ | Pouring of water and $CO_2$ | 0.22 |
| January $5^{th}$ | Pouring of water and $CO_2$ | 0.18 |
| January $20^{th}$ | Pouring of water | 0.057 |
| February $12^{th}$ | Pouring of water and $CO_2$ and termination | 0.035 |

Figure 6:
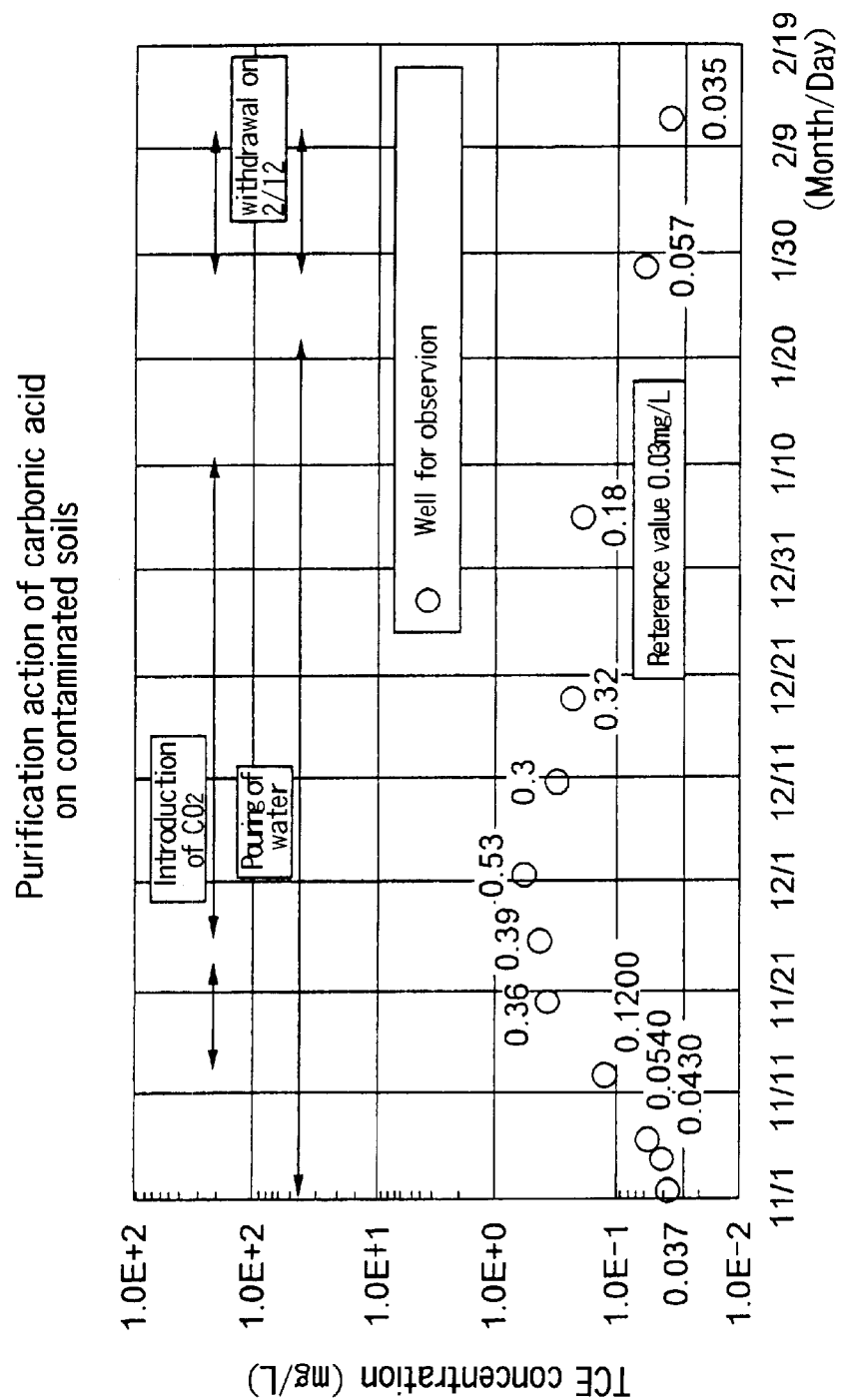
FIG. 6 is a graph showing the results of Example 4.

The above Table and FIG. 6 reveal that the remediation treatment of only pouring of water slightly increases the concentration of TEC but the introduction of carbon dioxide brings about rapid rising to cause a figure of the concentration to take up. Hence, the remediation treatment of the invention gives an efficient remediation. In more detail, surprisingly the remediation treatment was complete in a short period of only two months.

What is claimed is:

1. A method for the remediation of soil contaminated with an organic halide compound, comprising causing a carbonic acid aqueous solution to penetrate into the soil to liberate and remove the organic halide compound contained in the soil, wherein, after penetration of the carbonic acid aqueous solution into the soil, the internal pressure in the soil is reduced intermittently to cause the carbonic acid to bubble.

2. A method for the remediation of soil contaminated with an organic halide compound, comprising providing wells for feeding carbonic acid and wells for pumping water with a distance between the wells in the soil by digging the soil, introducing a carbonic acid aqueous solution into the wells for feeding carbonic acid to liberate contaminants contained in the soil, and pumping up water from the wells for pumping water to remove the liberated contaminants, wherein, after the introduction of the carbonic acid aqueous solution into the soil, the internal pressure in the soil is reduced intermittently to cause the carbonic acid to bubble.

3. A method for the remediation of soil contaminated with an organic halide compound, comprising providing wells for feeding carbonic acid and wells for pumping water with a distance between the wells in the soil by digging the soil, introducing a carbon dioxide gas into the wells for feeding carbonic acid to liberate contaminants in the soil, and pumping up water from the wells for pumping water to remove the liberated contaminants, wherein, after the introduction of the carbon dioxide gas into the soil, the internal pressure in the soil is reduced intermittently to cause the carbonic acid, formed by the carbon dioxide gas and water to bubble.

4. A method for the remediation of soil contaminated with an organic halide compound, comprising providing a water cutoff wall for surrounding the soil, providing wells for feeding carbonic acid and wells for pumping water with a distance between the wells in the soil surrounded by the water cutoff wall by digging the soil, introducing a carbonic acid aqueous solution into the wells for feeding carbonic acid to elevate a level of groundwater in the wells and to wet the soil to the surface thereof, whereby contaminants contained in the soil are liberated, and pumping up water from the wells for pumping water to remove the liberated contaminants, wherein, after the introduction of the carbonic acid aqueous solution into the soil, the internal pressure in the soil is reduced intermittently to cause the carbonic acid to bubble.

5. A method for the remediation of soil contaminated with an organic halide compound, comprising providing a water cutoff wall for surrounding the soil, providing wells for feeding carbonic acid and wells for pumping water with a distance between the wells in the soil surrounded by the water cutoff wall by digging the soil, introducing a carbon dioxide gas into the wells for feeding carbonic acid to elevate a level of groundwater in the wells and to wet the soil to the surface thereof, whereby contaminants contained in the soil are liberated, and pumping up water from the wells for pumping water to remove the liberated contaminants, wherein, after the introduction of the carbon dioxide gas into the soil, the internal pressure in the soil is reduced intermittently to cause the carbonic acid, formed by the carbon dioxide gas and water to bubble.

6. The method of claim 1, 2, 3, 4, or 5, wherein the contaminants contained in the soil are eluted in the carbonic acid aqueous solution.

7. The method of claim 1, 2, 3, 4, or 5, wherein the contaminants contained in the soil are soluble in water.

8. The method of claim 1, 2, or 4, wherein the introduction or penetration of the carbonic acid aqueous solution into the soil comprises introducing the solution or causing it to penetrate into the soil and subsequently passing the solution through the soil.

9. The method of claim 3 or 5, wherein water is poured onto the soil before the introduction of carbon dioxide.

10. The method of claim 1, 2, or 4, wherein plural solutions with different concentrations from each other as the aqueous solution are alternately introduced into the soil.

11. The method of claim 3 or 5, wherein the carbon dioxide is alternately introduced into the soil at different feeding rates.

* * * * *